United States Patent
Theimer et al.

(10) Patent No.: US 12,262,309 B2
(45) Date of Patent: Mar. 25, 2025

(54) NETWORK FUNCTION SELECTION

(71) Applicant: Nokia Technologies Oy, Espoo (FI)

(72) Inventors: Thomas Theimer, Baierbrunn (DE); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 619 days.

(21) Appl. No.: 17/619,285

(22) PCT Filed: Jun. 17, 2019

(86) PCT No.: PCT/US2019/037461
§ 371 (c)(1),
(2) Date: Dec. 15, 2021

(87) PCT Pub. No.: WO2020/256688
PCT Pub. Date: Dec. 24, 2020

(65) Prior Publication Data
US 2022/0303886 A1    Sep. 22, 2022

(51) Int. Cl.
*H04W 48/18* (2009.01)
*H04W 4/50* (2018.01)
(Continued)

(52) U.S. Cl.
CPC .......... *H04W 48/18* (2013.01); *H04W 4/50* (2018.02); *H04W 24/08* (2013.01); *H04W 48/14* (2013.01); *H04W 48/16* (2013.01)

(58) Field of Classification Search
CPC ....... H04W 48/18; H04W 4/50; H04W 24/08; H04W 48/14; H04W 48/16; H04W 4/24;
(Continued)

(56) References Cited

U.S. PATENT DOCUMENTS

| 4,756,019 A | 7/1988 | Szybicki |
| 2011/0158090 A1 | 6/2011 | Riley et al. |

(Continued)

FOREIGN PATENT DOCUMENTS

WO    2017/144113 A1    8/2017

OTHER PUBLICATIONS

International Search Report and Written Opinion dated Sep. 11, 2019 corresponding to International Patent Application No. PCT/US2019/037461.

(Continued)

*Primary Examiner* — Yu-Wen Chang
(74) *Attorney, Agent, or Firm* — Barta Jones, PLLC (57) ABSTRACT

It is provided a method, comprising querying a network repository function to provide a respective identifier of each of one or more network functions; selecting a selected identifier of the one or more identifiers received in response to the querying; requesting a service from the network function identified by the selected identifier, wherein each of the network functions provides the service and fulfills a condition; the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function.

20 Claims, 5 Drawing Sheets

(51) Int. Cl.
  *H04W 24/08* (2009.01)
  *H04W 48/14* (2009.01)
  *H04W 48/16* (2009.01)

(58) Field of Classification Search
  CPC ... H04W 24/02; H04L 12/1407; H04M 15/61; H04M 15/66; H04M 15/8033; H04M 15/8038; H04M 15/8044
  See application file for complete search history.

(56) References Cited

U.S. PATENT DOCUMENTS

| | | | |
|---|---|---|---|
| 2011/0264780 A1 | 10/2011 | Reunamaki et al. | |
| 2014/0226487 A1 | 8/2014 | Forssell et al. | |
| 2015/0126192 A1 | 5/2015 | Huang et al. | |
| 2015/0288529 A1 | 10/2015 | Kekki | |
| 2018/0317121 A1 | 11/2018 | Liao et al. | |
| 2018/0332632 A1 | 11/2018 | Vikberg et al. | |
| 2020/0196227 A1* | 6/2020 | Young | G06F 9/45558 |
| 2021/0168705 A1* | 6/2021 | Fiorese | H04W 12/037 |
| 2022/0191294 A1* | 6/2022 | Yang | H04L 41/5058 |

OTHER PUBLICATIONS

3GPP TS 23.501 V16.0.2 (Apr. 2019), Technical Specification, 3rd Generation Partnership Project; Technical Specification Group Services and System Aspects; System Architecture for the 5G System; Stage 2 (Release 16), Apr. 2019.

3GPP TR 23.791 V16.1.0 (Mar. 2019), Technical Report, 3rd Generation Partnership Project; Technical Specification Group Services and System Aspects; Study of Enablers for Network Automation for 5G (Release 16), Mar. 2019.

3GPP TS 29.510 V15.3.0 (Mar. 2019), Technical Specification, 3rd Generation Partnership Project; Technical Specification Group Core Network and Terminals; 5G System; Network Function Repository Services; Stage 3 (Release 15), Mar. 2019.

3GPP TS 29.571 V15.3.0 (Mar. 2019), Technical Specification, 3rd Generation Partnership Project; Technical Specification Group Core Network and Terminals; 5G System; Common Data Types for Service Based Interfaces; Stage 3 (Release 15), Mar. 2019.

* cited by examiner

Fig. 1

| Location A | Location B | Physical distance | Topological distance | Time distance | Packet delay budget | Transport delay |
|---|---|---|---|---|---|---|
| RAN 1 | UPF 1 | 10 m | 1 hop | 1 microsec | 0,01 ms | 0,01 ms |
| RAN 1 | UPF 2 | 10 km | 3 hops | 0,05 ms | 0,5 ms | 0,1 ms |
| RAN 1 | UPF 3 | 100 km | 5 hops | 0,5 ms | 2 ms | 1 ms |
| RAN 2 | UPF 1 | 10 km | 3 hops | 0,05 ms | 0,5 ms | 0,1 ms |
| RAN 2 | UPF 2 | 10 m | 1 hop | 10 microsec | 0,1 ms | 0,1 ms |
| RAN 2 | UPF 3 | 100 km | 5 hops | 0,5 ms | 2 ms | 1 ms |
| ... | | | | | | |

NETWORK FUNCTION SELECTION

RELATED APPLICATION

This application was originally filed as PCT Application No. PCT/US2019/037461, filed on Jun. 17, 2019, of which is incorporated herein by reference in its entirety.

FIELD OF THE INVENTION

The present invention relates to network function selection.

Abbreviations

3GPP 3$^{rd}$ Generation Partnership Project
3G/4G/5G 3$^{rd}$/4$^{th}$/5$^{th}$ Generation
5GS 5G System
CP Control Plane
NF Network Function
NRF Network Function Repository Function
NWDAF Network Data Analytics Function
OAM Operations and Management
PDU Protocol Data Unit
RAN Radio Access Network
SCP Service Communication Proxy
SLA Service Level Agreement
SMF Session Management Function
SQL Structured Query Language
TR Technical Report
UE User Equipment
UP User Plane
UPF User Plane Function
TS Technical Specification

BACKGROUND OF THE INVENTION

3GPP has defined a 5G core architecture that allows for automated network function (NF) and service discovery and selection. A NF consumer can query the NRF using the NRF discovery service, where the query can include various attribute value pairs that the NRF will use to find and filter matching database entries related to the network functions.

Figure 1:
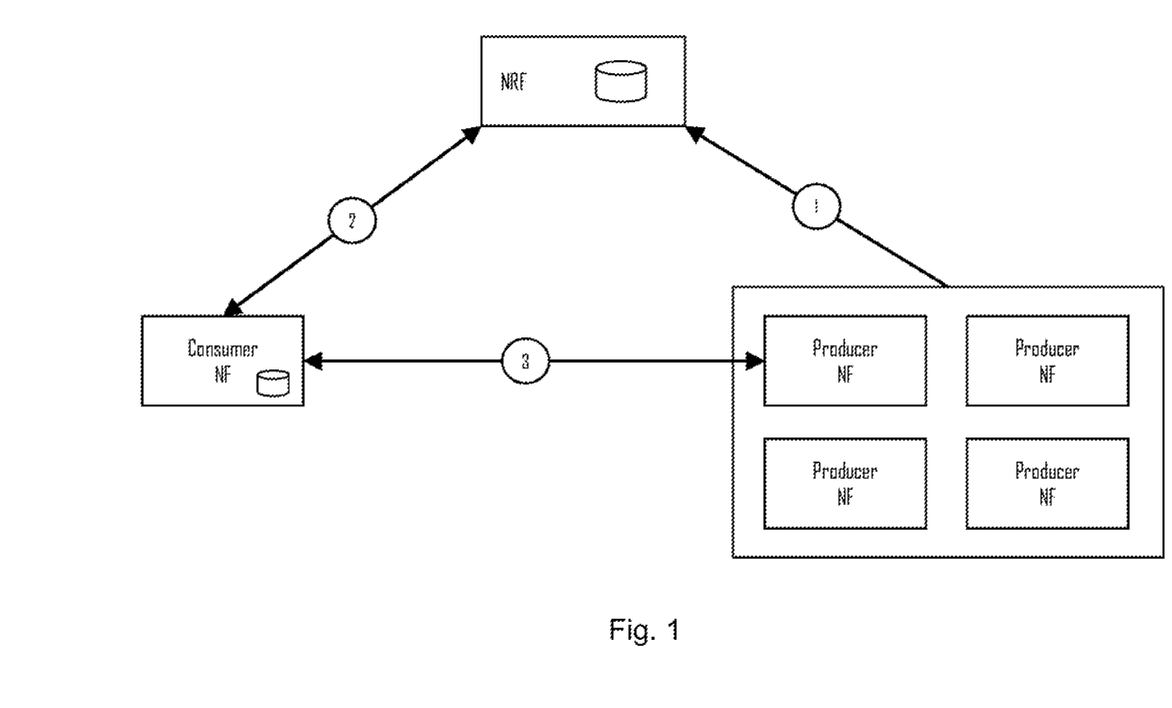
FIG. 1 shows the principle of network function discovery and selection.

FIG. 1 shows the principle of network function discovery and selection according to current standards. It has 3 steps:

1. NF registration to the NRF: The NFs register the services/capabilities offered to the NRF. Registration may be directly from NF to NRF or via OAM.
2. NF discovery: The consumer sends a discovery query to the NRF and receives a discovery response from the NRF. The discovery response includes a list of one or more candidate NFs. NRF selects the candidate NFs based on e.g. NF type, set, network slice, and/or required service.
3. NF selection by the consumer based on the discovery response provided by NRF. Consumer may select the NF out of the list of candidate NFs based on e.g. load, location and other metadata. Then, consumer requests the service from the selected NF.

Consumers may cache NRF discovery responses to keep NRF load low. In this case, they may subscribe to NRF updates. In step 3, they may use the cached or updated NRF discovery response for the selection.

The current query mechanism allows for simple queries, where all given attribute values must match. There is also a complex query option which allows logical combinations of attribute-value pairs: logical AND and logical OR are supported in 3GPP TS 23.501, 3GPP TS 29.510, and 3GPP TS 29.571.

According to the prior art, a (consuming) SMF is configured with further information that may include the latency between a UPF and a RAN node. This allows the SMF to select a UPF with the lowest latency to a specific RAN location.

Among the set of attributes of current standards, there is also a locality parameter that can be used to discover NFs in a specific geographic location or data center. Due to the exact match, this implies that the location of the NF to be discovered (e.g. data center or geographic location) has already been determined by the consumer.

NWDAF assisted UPF selection is described in 3GPP TR 23.791 (eNA study). Here the consumer needs to query the NWDAF in addition to querying the NRF.

SUMMARY OF THE INVENTION

It is an object of the present invention to improve the prior art.

According to a first aspect of the invention, there is provided an apparatus, comprising means for querying configured to query a network repository function to provide a respective identifier of each of one or more network functions; means for selecting configured to select a selected identifier of the one or more identifiers received in response to the querying; means for requesting configured to request a service from the network function identified by the selected identifier, wherein each of the one or more network functions provides the service and fulfills a condition; the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function; f the condition is a distance condition and the distance is a spatial distance, the condition requires that the distance is larger than 0.

According to a second aspect of the invention, there is provided an apparatus, comprising means for querying configured to query a network repository function to provide a respective identifier of each of one or more network functions; means for selecting configured to select a selected identifier of the one or more identifiers received in response to the querying; means for requesting configured to request a service from the network function identified by the selected identifier, wherein each of the one or more network functions provides the service and fulfills a condition; the condition comprises an inequality condition.

According to a third aspect of the invention, there is provided an apparatus, comprising means for monitoring configured to monitor if a query to provide a respective identifier of each of one or more network functions providing a service and fulfilling a condition is received; means for determining configured to determine the respective identifier of each of the one or more network functions providing the service and fulfilling the condition; means for providing configured to provide the determined one or more identifiers in response to the receiving of the query, wherein the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function; if the condition is a distance condition and the distance is a spatial distance, the condition requires that the distance is larger than 0.

According to a fourth aspect of the invention, there is provided an apparatus, comprising means for monitoring configured to monitor if a query to provide a respective identifier of each of one or more network functions providing a service and fulfilling a condition is received; means for identifying configured to identify the respective identifier of each of the one or more network functions providing the service and fulfilling the condition; means for providing configured to provide the identified one or more identifier in response to receiving the query, wherein the condition comprises an inequality condition.

According to a fifth aspect of the invention, there is provided a method, comprising querying a network repository function to provide a respective identifier of each of one or more network functions; selecting a selected identifier of the one or more identifiers received in response to the querying; requesting a service from the network function identified by the selected identifier, wherein each of the one or more network functions provides the service and fulfills a condition; the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function; if the condition is a distance condition and the distance is a spatial distance, the condition requires that the distance is larger than 0.

According to a sixth aspect of the invention, there is provided a method, comprising querying a network repository function to provide a respective identifier of each of one or more network functions; selecting a selected identifier of the one or more identifiers received in response to the querying; requesting a service from the network function identified by the selected identifier, wherein each of the one or more network functions provides the service and fulfills a condition; the condition comprises an inequality condition.

According to a seventh aspect of the invention, there is provided a method, comprising monitoring if a query to provide a respective identifier of each of one or more network functions providing a service and fulfilling a condition is received; determining the respective identifier of each of the one or more network functions providing the service and fulfilling the condition; providing the determined one or more identifiers in response to the receiving of the query, wherein the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function; if the condition is a distance condition and the distance is a spatial distance, the condition requires that the distance is larger than 0.

According to an eighth aspect of the invention, there is provided a method, comprising monitoring if a query to provide a respective identifier of each of one or more network functions providing a service and fulfilling a condition is received; identifying the respective identifier of each of the one or more network functions providing the service and fulfilling the condition; providing the identified one or more identifier in response to receiving the query, wherein the condition comprises an inequality condition.

Each of the methods of the fifth to eighth aspects may be a method of network function selection.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the invention, at least one of the following advantages may be achieved:
Queries according to the intention of the consumer are enabled;
Consumer need not to know the details of the network (such as locations of potential network functions to be selected, topology);
Solution is scalable.
Easy maintenance because the number of NRFs in a network is typically relatively low, compared to the number of consumer network functions.
Consistency throughout the network may be easily obtained;
NRF may use automated mechanisms to obtain the needed values of parameters
Consumer NF may be simplified.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

It would be beneficial if the (consuming) SMF may select a producer UPF within a certain distance from the UE (respectively its serving RAN node or to another intermediate UPF that connects to the serving RAN node) requesting the session.

Large networks with distributed UPF deployments can have thousands of RAN and UPF node locations. Configuring specific values for parameters like delay in multiple SMF network functions will become very cumbersome and is not scalable. Many network functions will not even have such a capability.

Some example embodiments of the invention provide a generic solution for NF discovery based on a set of constraints related to location selection. They may also (or alternatively) include performance and/or capacity constraints. In some example embodiments, at least one of the constraints may be expressed using a comparison operator such as ">" (larger than) and "<" (smaller than), i.e., an inequality. Database query languages like SQL offer such operators, whereas http query parameters only allow exact match.

Examples for location constraints include physical distance, time distance, topological distance (number of hops based on network topology), propagation delay, transport delay, packet delay budget. All location constraints are relative to a reference point, that is either the consumer itself or another NF such as a RAN node serving the UE. Performance and capacity constraints include average residence or processing time in a NF, quantile of residence time, supported peak data rate of PDU sessions, total dataplane capacity of a NF, load level of a NF, availability or reliability of a NF. Such constraints do not currently exist in NRF queries. Here, "physical distance" (or "spatial distance") may be related to distances larger than 0, which is not covered by the locality parameter according to current standards.

Here, the transport delay is the amount of time required for the transport network (e.g. an IP network) to carry the packet between the two network functions. The propagation delay is the time it takes a bit to propagate from one router (network function) to the next according to the speed of light in optical fiber, and excludes the processing time in routers and switches. The packet delay budget defines the (maximum) time for the transmission of a packet from the producer NF to the consumer NF, including statistical variations of the delay caused by packet processing and buffering within UPF. The total dataplane capacity indicates the capacity available for dataplane (UP) traffic of a network function.

A simple use case example according to some example embodiments of the invention is finding a UPF that is close to a RAN node, with a max latency between UPF and RAN of 2 ms. The SMF could formulate an NRF query that states the packet delay budget must be <2 ms, and the NRF would return all UPFs meeting that constraint.

Another use case example according to some example embodiments of the invention is discovering an SMF with a max time distance from the serving AMF of 5 ms and a maximum load of 50%, to ensure high performance session management for a mission-critical network slice.

Some example embodiments of this invention optimize step 2 of the network function discovery procedure of FIG. 1 by adding constraint-based query options, as well as optionally returning the actual attribute values to aid in NF selection. Consuming NF may be any NF (in particular those defined as part of the 5G core architecture, including also the SCP which may include support for delegated network function discovery on behalf of a NF consumer).

According to some example embodiments of the invention, at least one of the following features is provided:

1. The standardized set of NRF query attributes may allow for attributes such as physical distance, time distance (i.e. time taken for signaling message exchange in case of CP NFs discovery, or UP packet transmission over N3/N9 in case of UPF discovery), topological distance (based on network topology), propagation delay, transport delay, packet delay budget. These attributes may require a reference point, relative to which the constraint is defined. The reference point may be e.g. the consuming NF (e.g. SMF), or the RAN node serving the UE requesting the session. Performance and capacity related attributes include average residence or response time in a NF, quantile of residence time (i.e. in case of UPF), supported peak data rate of PDU sessions, total data plane capacity of a NF, load level of a NF, availability or reliability of a NF. Such constraints do not currently exist in NRF queries.

2. NRF query operations may include comparison operators, such as < (smaller than) or > (larger than) to specify upper and/or lower bounds. Thus, the relevant condition may comprise one or more inequalities, which can be also combined with complex query operations (logical AND/OR).

3. The NRF may comprise some logic for resolving queries with comparison operators. Some of the values of the attribute(s) used for comparison (e.g. NF load) may be known to the NRF as part of the NF profile. Other attributes may not be known to the NRF. NRF may determine them when processing the query. There are several options for the NRF to determine the values of these attributes:
   a. The NRF may query the NWDAF to collect statistics and insights that help determine some attribute values (e.g. performance related attributes).
   b. The NRF may consume data exposure services of the network functions.
   c. The NRF may use network topology and inventory data to derive or estimate some of the attribute values related to topology and location.

4. The NRF may preferably return the actual attribute values in its response to the consuming NF, so that the consumer can still select the best matching result (e.g. UPF offering the lowest latency or highest throughput). If the actual attribute values for some or all of the attributes included in the query are not known to the consumer, the consumer may select the network function based on the known attribute values or based on some other criteria (e.g. based on a criterion known from a previous query, or based on a predefined criterion, or even randomly).

Some of the attribute values used in the inequalities may be determined by benchmarking. Benchmarking may be performed (or an estimation may be done) at the time of network setup between NFs in the network to determine time distance (i.e. time taken to transfer signaling messages between any 2 NFs) and other attribute values. These values may be stored in NRF, used to decide if a constraint is fulfilled, and/or forwarded to the consuming NF in response to its query.

Hereinafter, a use case of an example embodiment of the invention is explained in detail. This use case is for UPF discovery. However, the invention is not limited to UPF discovery but may also be employed for discovery of any control plane NF, too. In this case, some of the same criteria as for UPF selection or further or different criteria than for UPF selection may be used.

When a consumer NF wants to discover a producer NF (here: a UPF), it sends a query to the NRF which includes one or several constraints, e.g. constraint 1: packet delay budget <5 ms; constraint 2: session peak data rate >1 Gbit/s, or any other constraint as listed hereinabove. The NRF will consult its database and return a set of UPFs that meet both (all) constraints, preferably along with the actual values of packet delay and supported peak data rate (and potentially values of the attributes used in the other constraints). The consumer NF then selects the best UPF based on the actual values (e.g. with the lowest delay or the highest peak data rate), as they are provided by NRF.

Figure 2:
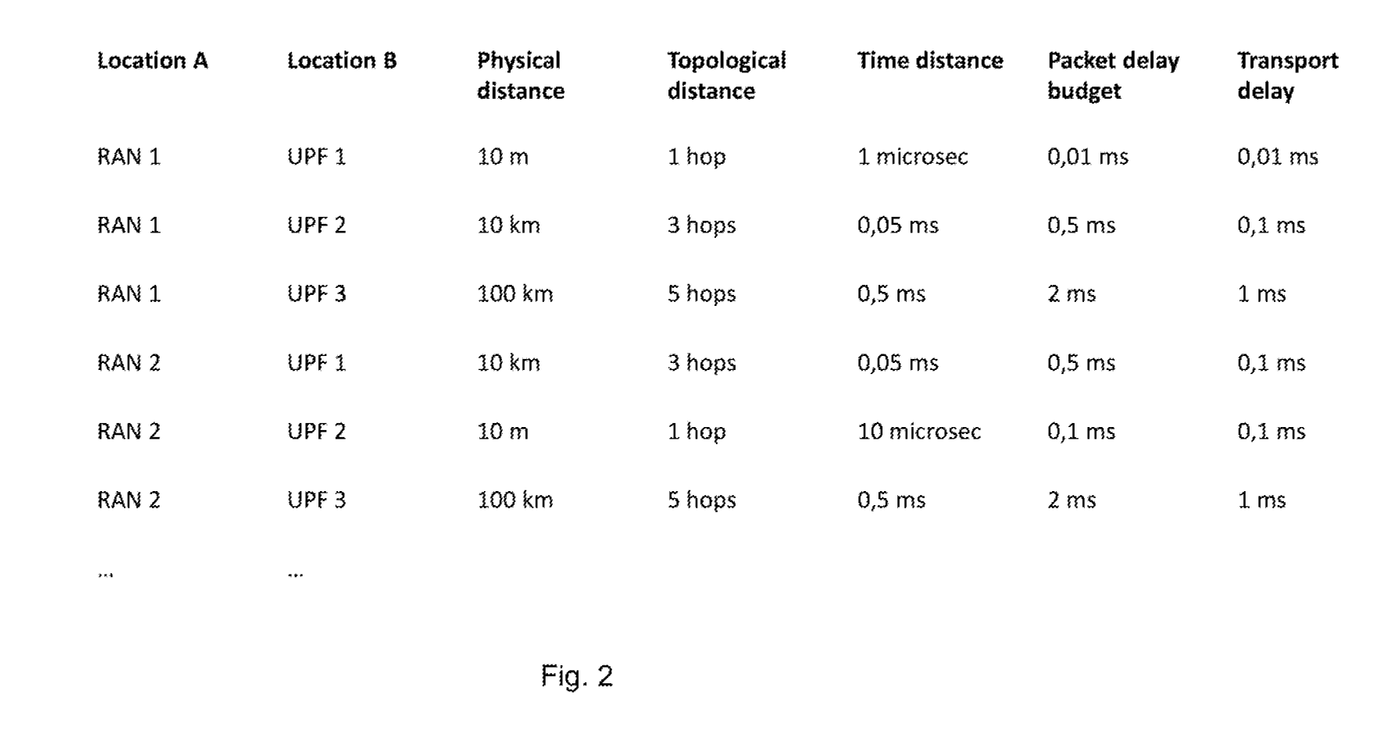
FIG. 2 shows a database structure inside the NRF according to some example embodiments of the invention.

FIG. 2 shows a database structure inside the NRF for the case of location-based constraints according to some example embodiments of the invention. In a simple case, the database structure comprises a table listing all combinations of locations, e.g. for RAN and UPF nodes. Locations may be geographical coordinates or site references or datacentre locations. In large networks, this table can become fairly large. The table may or may not be fully populated. For example, it may include on specific combinations of RAN and UPF nodes which are all within the same geographic area, eliminating useless combinations that would never be selected.

A first advantage of having this table centralized at the NRF is that it is easier to maintain as there are only a few NRF in a typical network where the data is kept, while there are many more NFs. The second advantage is that there is a consistent logic for collection and interpretation of these constraints across the network, rather than each NF implementing its own way to obtain constraints. The third advantage is that the NRF can use automated mechanisms to obtain some or all of the attribute values used in the constraints from interactions with a) a network topology and inventory database; and/or
b) other network functions collecting data and exposing insights, specifically NWDAF.

Figure 3:
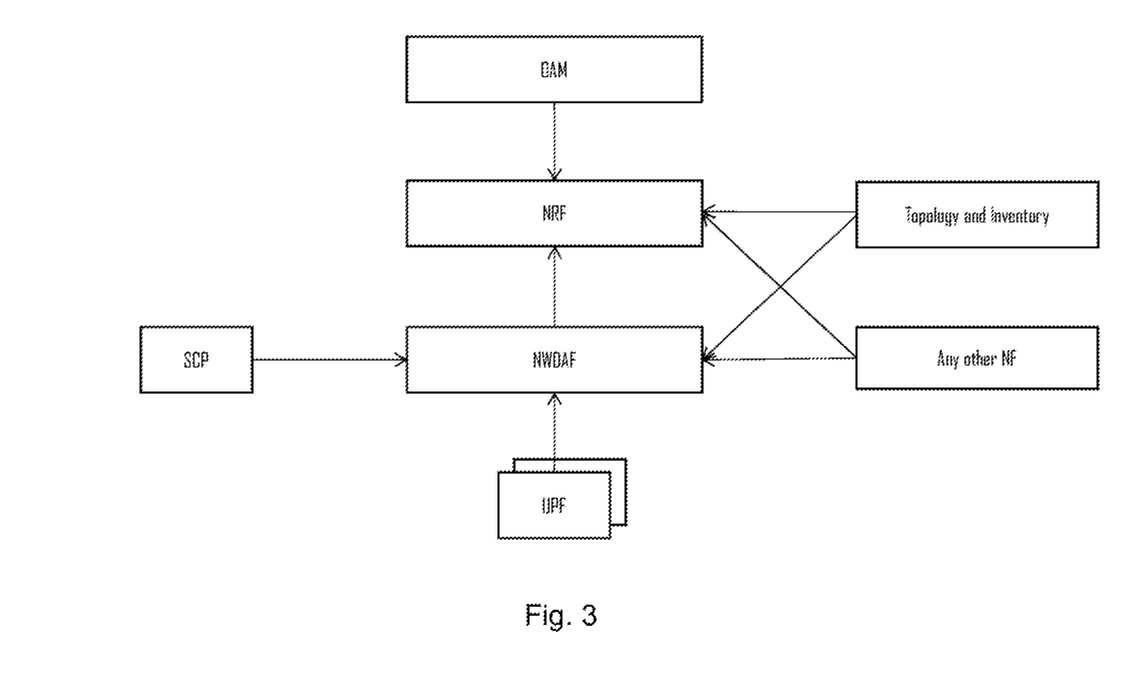
FIG. 3 shows NRF data collection related to query constraints according to some example embodiments of the invention.

FIG. 3 illustrates NRF data collection related to query constraints according to some example embodiments of the invention. The NRF may query attribute values used in the constraint queries from one or more of OAM, NWDAF, topology database, inventory database, or from any network function. NWDAF may obtain the attribute values e.g. from SCP and one or more UPFs. Instead of querying, these functions may actively provide the respective attribute values to NRF ("push" instead of "pull"). In some example embodiments of the invention, "pushing" and/or "pulling" may be performed independent from an actual constraint query, such that the NRF buffers the obtained attribute values in its memory to be used for an upcoming constraint query. In some example embodiments, NRF queries the other functions only if needed due to an actual constraint query.

In a simple example embodiment, all (or some of) the attribute values are obtained from offline measurements or calculations and configured in the NRF using OAM (operations and management systems).

In another example embodiment, the NRF has additional capabilities to use topology and inventory data to understand the network topology, from which it can e.g. derive the hop count (topological distance) and in general identify the location of all NFs in the topology. In addition, the NRF can interact with the NWDAF (Network Data Analytics Function), which could provide statistics based on measurement data collected by other network functions. For example, NWDAF could collect data from SCP about the typical response time of network functions. It could also collect data from UPFs that are able to measure user plane latency relative to peers in the user plane. NF load and KPI data can be obtained from the OAM system as well. There is potentially a rich set of data sources an NRF may exploit to generate per NF or per location constraint values. Note that not all the required exposure capabilities are already standardized in 3GPP Release 16. Extensions of the standard are recommended.

Ideally, the NRF can obtain all relevant attribute values from measurements and NF data exposure, which has the benefit for the operator that no offline measurements or manual provisioning of data is needed.

This invention also simplifies all NF consumers that require distance- or performance- or capacity- or operational state- or reliability-based selection, such as mission-critical and low-latency or high-reliability network slices, which may have SLAs specifying latency, performance or reliability targets. The new set of constraints enables intelligent, intent-based selection of producer NFs in a slice that help to meet specific SLA targets. For example, a consumer NF can request a high-reliability UPF that supports at least 500 Mbit/sec peak data rate and is within a latency of 5 ms from the serving RAN node (intent is defined as a set of constraints). With existing NRF query capabilities, it would only be possible to discover a UPF that is co-located with the RAN node (location=RAN node location).

Optimizing network slices to meet SLA targets is an important goal for future 5G systems, which has implications not only for the slice design (deployment and configuration of NFs in a slice), but also for the dynamic behaviour and intelligent NF producer selection according to such SLA targets. Typical SLA targets are latency, reliability, but also per-user throughput.

Figure 4:
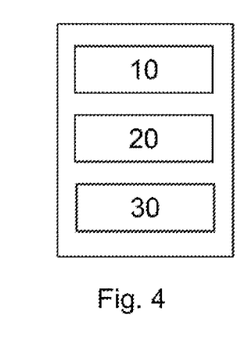
FIG. 4 shows an apparatus according to an example embodiment of the invention.
Figure 5:
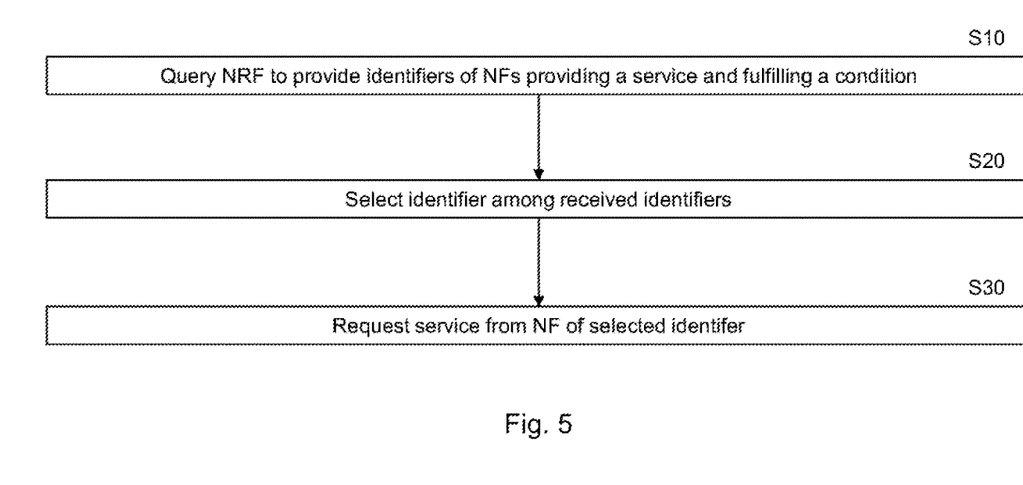
FIG. 5 shows a method according to an example embodiment of the invention.

FIG. 4 shows an apparatus according to an embodiment of the invention. The apparatus may be a consumer such as a consumer NF, or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for querying 10, means for selecting 20, and means for requesting 30. The means for querying 10, means for selecting 20, and means for requesting 30 may be a querying means 10, selecting means 20, and requesting means 30, respectively. The means for querying 10, means for selecting 20, and means for requesting 30 may be a querist, selector, and requestor, respectively. The means for querying 10, means for selecting 20, and means for requesting 30 may be a querying processor, selecting processor, and requesting processor, respectively.

The means for querying 10 queries a network repository function to provide a respective identifier of each of one or more network functions (S10). Each of the one or more network functions provides a service and fulfills a condition.

The means for selecting 20 selects a selected identifier of the one or more identifiers received in response to the querying (S20). The means for requesting 30 requests the service from the network function identified by the selected identifier (S30).

According to some example embodiments, the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function. If the condition is a distance condition and the distance is a spatial distance, the condition requires that the distance is larger than 0.

According to some example embodiments (which may be the same example embodiments as discussed in the previous paragraph or different therefrom), the condition comprises an inequality condition.

Figure 6:
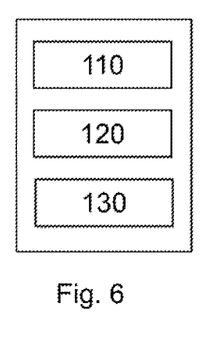
FIG. 6 shows an apparatus according to an example embodiment of the invention.
Figure 7:
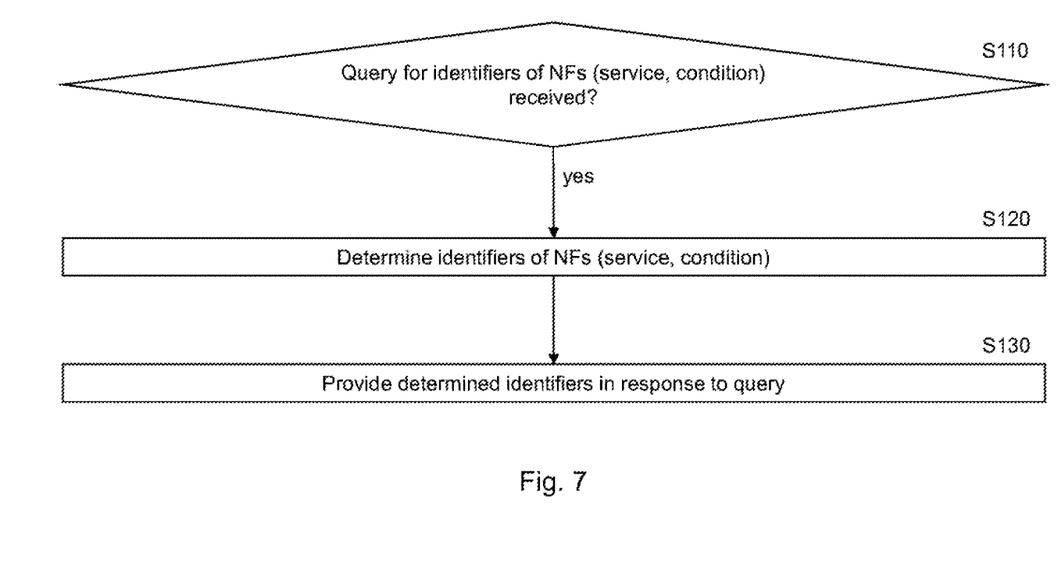
FIG. 7 shows a method according to an example embodiment of the invention.

FIG. 6 shows an apparatus according to an embodiment of the invention. The apparatus may be a repository function such as a NRF, or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for monitoring 110, means for determining 120, and means for providing 130. The means for monitoring 110, means for determining 120, and means for providing 130 may be a monitoring means 110, determining means 120, and providing means 130, respectively. The means for monitoring 110, means for determining 120, and means for providing 130 may be a monitor, determiner, and provider, respectively. The means for monitoring 110, means for determining 120, and means for providing 130 may be a monitoring processor, determining processor, and providing processor, respectively.

The means for monitoring 110 monitors if a query to provide a respective identifier of each of one or more network functions providing a service and fulfilling a condition is received (S110).

If the query is received (S110=yes), the means for determining 120 determines the respective identifier of each of the one or more network functions providing the service and fulfilling the condition (S120). The means for providing 130 provides the determined one or more identifiers in response to the receiving of the query (S130), i.e. in response to the query of S110.

According to some example embodiments of the invention, the condition comprises at least one of a distance condition related to a distance between the respective network function and a reference point, a performance condition related to a performance of the respective network function, a capacity condition related to a capacity of the respective network function, an operational state condition related to an operational state of the respective network function, and a reliability condition related to a reliability of the respective network function. If the condition is a distance condition and the distance is a spatial distance, the condition requires that the distance is larger than 0.

According to some example embodiments (which may be the same example embodiments as discussed in the previous paragraph or different therefrom), the condition comprises an inequality condition.

Figure 8:
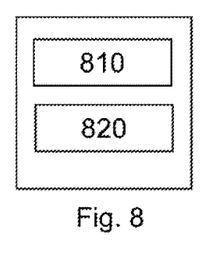
FIG. 8 shows an apparatus according to an example embodiment of the invention.

FIG. 8 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 5 and 7.

Embodiments of the invention are described for 5G networks. However, the invention is not restricted to 5G networks and may be employed in other 3GPP networks such as 3G networks, 4G networks, and upcoming 3GPP releases, too. The invention may be employed in non-3GPP networks provided they comprise a function corresponding to a network function repository function.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a network function such as a UPF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a network function repository function, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, for querying a network repository function to provide a respective identifier of each of one or more network functions, the apparatus comprising:
a processor; and
a memory comprising computer-executable instructions that, when executed by the processor, cause the processor to perform the following operations:
query a network repository function to provide a respective identifier of each network function that provides a service and fulfill a set of conditions, the set of conditions comprising: a distance condition related to a distance between a respective network function and a reference point, a performance condition related to a performance of the respective network function, a capacity condition related to a capacity of the respective network function, an operational state condition related to an operational state of the respective network function, and a reliability condition related to a reliability of the respective network function, and wherein:
the performance comprises at least one of an average residence time in the respective network function, and a quantile of a residence time in the respective network function;
the capacity condition comprises a supported peak data rate provided by the respective network function for the service, a total capacity provided by the respective network function for the service, and a load level of the respective network function; and
the operational state condition comprises an availability of the respective network function;
based on the query, receive one or more respective identifiers of each of the one or more network functions that provide the service and fulfill the set of conditions;
compare for each of the one or more received respective identifiers the set of conditions with respective condition thresholds;
based on the comparing, select an identifier of the one or more received respective identifiers; and
request a service from a network function identified by the selected identifier.

2. The apparatus according to claim 1, wherein the distance comprises a spatial distance, a topological distance, and a time distance.

3. The apparatus according to claim 2, wherein the time distance comprises a propagation delay, a transport delay, and a packet delay budget.

4. The apparatus according to claim 1, wherein the distance condition and the distance is a spatial distance, and wherein the distance condition requires that the distance is larger than 0.

5. The apparatus according to claim 1, wherein the set of conditions comprises an inequality condition.

6. The apparatus according to claim 1, wherein
selecting the identifier is based on an actual value of an attribute on which the set of conditions is based, wherein for at least one of the one or more network functions the respective actual value is received in response to the querying.

7. The apparatus according to claim 1, wherein the memory stores the set of conditions for each of the one or more network functions, and wherein the set of conditions for each of the network functions is accessed from the memory.

8. A method for querying a network repository function to provide a respective identifier of each of one or more network functions, the method comprising:
querying a network repository function to provide a respective identifier of each network function that provides a service and fulfill a set of conditions, the set of conditions comprising: a distance condition related to a distance between a respective network function and a reference point, a performance condition related to a performance of the respective network function, a capacity condition related to a capacity of the respective network function, an operational state condition related to an operational state of the respective network function, and a reliability condition related to a reliability of the respective network function, and wherein:
the performance comprises at least one of an average residence time in the respective network function, and a quantile of a residence time in the respective network function;
the capacity condition comprises a supported peak data rate provided by the respective network function for the service, a total capacity provided by the respective network function for the service, and a load level of the respective network function; and
the operational state condition comprises an availability of the respective network function;
based on the query, receiving one or more respective identifiers of each of the one or more network functions that provide the service and fulfill the set of conditions;
comparing, for each of the one or more received respective identifiers, the set of conditions with respective condition thresholds;
based on the comparing, selecting an identifier of the one or more received respective identifiers; and
requesting a service from a network function identified by the selected identifier.

9. The method according to claim 8, wherein the distance comprises a spatial distance, a topological distance, and a time distance.

10. The method according to claim 9, wherein the time distance comprises a propagation delay, a transport delay, and a packet delay budget.

11. The method according to claim 8, wherein the distance condition and the distance is a spatial distance, and wherein the distance condition requires that the distance is larger than 0.

12. The method according to claim 8, wherein the set of conditions comprises an inequality condition.

13. The method according to claim 8, wherein selecting the identifier is based on an actual value of an attribute on which the set of conditions is based, wherein for at least one of the one or more network functions the respective actual value is received in response to the querying.

14. The method according to claim 8, wherein the set of conditions for each of the one or more network functions is accessed from a memory.

15. A non-transitory computer-readable medium comprising computer-executable instructions that, when executed by a processor, cause the processor to perform the following operations:
querying a network repository function to provide a respective identifier of each network function that provides a service and fulfill a set of conditions, the set of conditions comprising: a distance condition related to a distance between a respective network function and a reference point, a performance condition related to a performance of the respective network function, a capacity condition related to a capacity of the respective network function, an operational state condition related to an operational state of the respective network function, and a reliability condition related to a reliability of the respective network function, and wherein:

the performance comprises at least one of an average residence time in the respective network function, and a quantile of a residence time in the respective network function;

the capacity condition comprises a supported peak data rate provided by the respective network function for the service, a total capacity provided by the respective network function for the service, and a load level of the respective network function; and the operational state condition comprises an availability of the respective network function;

based on the query, receiving one or more respective identifiers of each of one or more network functions that provide the service and fulfill the set of conditions;

comparing, for each of the one or more received respective identifiers, the set of conditions with respective condition thresholds;

based on the comparing, selecting an identifier of the one or more received respective identifiers; and requesting a service from a network function identified by the selected identifier.

16. The non-transitory computer-readable medium according to claim 15, wherein the distance comprises a spatial distance, a topological distance, and a time distance.

17. The non-transitory computer-readable medium according to claim 16, wherein the time distance comprises a propagation delay, a transport delay, and a packet delay budget.

18. The non-transitory computer-readable medium according to claim 15, wherein the distance condition and the distance is a spatial distance, and wherein the distance condition requires that the distance is larger than 0.

19. The non-transitory computer-readable medium according to claim 15, wherein the set of conditions comprises an inequality condition.

20. The non-transitory computer-readable medium according to claim 15, wherein selecting the identifier is based on an actual value of an attribute on which the set of conditions is based, wherein for at least one of the one or more network functions the respective actual value is received in response to the querying.

* * * * *